United States Patent
Primdahl et al.

[19]

[11] Patent Number: 5,888,381
[45] Date of Patent: Mar. 30, 1999

[54] WATER FILTER WITH PRESSURE ACTUATED FLOW MONITOR

[75] Inventors: Richard D. Primdahl, Hoffman Estates; Dale A. Squier, Oswego; John Zabinski, Naperville, all of Ill.

[73] Assignee: United States Filter Corporation, Palm Desert, Calif.

[21] Appl. No.: 857,418

[22] Filed: May 16, 1997

[51] Int. Cl.$^6$ .............................. B01D 17/12; G01F 1/56
[52] U.S. Cl. .................. 210/87; 73/861.08; 200/81.9 R; 200/81.9 M; 210/90; 210/94; 210/138; 210/282; 340/609
[58] Field of Search .................. 210/85, 87, 89, 210/94, 100, 282, 266, 449, 460, 472, 90, 138; 222/36; 340/603, 606, 609; 55/270, 274; 73/861, 861.08; 96/417, 422; 200/81.9 R, 81.9 M

[56] References Cited

U.S. PATENT DOCUMENTS

| | | | |
|---|---|---|---|
| 2,751,458 | 6/1956 | Kayuha, Jr. ............................. | 200/83 |
| 3,494,198 | 2/1970 | Kaminky et al. ....................... | 73/389 |
| 3,512,643 | 5/1970 | Forss .................................... | 210/96.1 |
| 3,635,083 | 1/1972 | Vaughn ................................. | 73/206 |
| 3,773,991 | 11/1973 | Kreiger et al. ........................ | 200/83 |
| 3,841,483 | 10/1974 | Overton ................................. | 210/87 |
| 3,853,761 | 12/1974 | McClory ............................... | 210/100 |
| 3,856,676 | 12/1974 | Grimme, Jr. et al. ................. | 210/96.1 |
| 3,875,358 | 4/1975 | Willcox ................................. | 200/83 |
| 3,941,077 | 3/1976 | Moore ................................... | 116/70 |
| 3,990,066 | 11/1976 | Malmgren ............................. | 340/285 |
| 4,001,801 | 1/1977 | Moulet .................................. | 340/239 |
| 4,082,066 | 4/1978 | Jones et al. ............................ | 210/93 |
| 4,134,026 | 1/1979 | Sone et al. ............................. | 307/137 |
| 4,200,775 | 4/1980 | Bodnar .................................. | 200/83 |
| 4,321,461 | 3/1982 | Walter, Jr. et al. .................... | 235/92 |
| 4,431,533 | 2/1984 | Wrede .................................... | 210/87 |
| 4,522,077 | 6/1985 | Koberle ................................. | 73/861.63 |
| 4,526,041 | 7/1985 | Beller et al. ........................... | 73/861.47 |
| 4,587,518 | 5/1986 | King ...................................... | 340/603 |
| 4,623,451 | 11/1986 | Oliver ................................... | 210/87 |
| 4,668,402 | 5/1987 | Norton .................................. | 210/662 |
| 4,683,054 | 7/1987 | Turnbull ................................ | 210/91 |
| 4,709,126 | 11/1987 | Miller et al. ........................... | 200/83 |
| 4,728,264 | 3/1988 | Tuckey .................................. | 417/44 |
| 4,772,386 | 9/1988 | Grout et al. ........................... | 210/91 |
| 4,808,994 | 2/1989 | Riley ..................................... | 340/825.57 |
| 4,885,081 | 12/1989 | Oliver ................................... | 210/87 |
| 4,900,883 | 2/1990 | Brane et al. ........................... | 200/83 |
| 4,918,426 | 4/1990 | Butts et al. ............................ | 340/611 |
| 5,089,144 | 2/1992 | Ozkahyaoglu et al. ............... | 210/767 |
| 5,236,578 | 8/1993 | Oleskow et al. ...................... | 210/87 |
| 5,324,434 | 6/1994 | Oikawa et al. ........................ | 210/87 |
| 5,328,597 | 7/1994 | Boldt et al. ............................ | 210/87 |
| 5,458,766 | 10/1995 | Ehara et al. ........................... | 210/87 |
| 5,527,450 | 6/1996 | Burrows ................................ | 210/85 |
| 5,527,451 | 6/1996 | Hembree et al. ...................... | 210/100 |
| 5,530,215 | 6/1996 | Couvreur .............................. | 200/83 |
| 5,549,010 | 8/1996 | Park et al. .............................. | 73/861.79 |
| 5,744,033 | 4/1998 | Bertrand et al. ....................... | 210/282 |

*Primary Examiner*—Joseph W. Drodge
*Attorney, Agent, or Firm*—Greer, Burns & Crain, Ltd.

[57] ABSTRACT

A faucet mounted water filtration system with a filter life monitor includes a filter housing with a flexible cap which deflects upon introduction of water into the housing. The deflection of the cap closes a switch on an electrical circuit which counts the time the water is flowing through the housing. Once a predetermined amount of time accumulates, the circuit generates a message to inform the user that the filter needs replacement. The invention further includes a selector switch on the electrical circuit for signaling the circuit to count one of two predetermined amounts of time prior to generating a message.

21 Claims, 4 Drawing Sheets

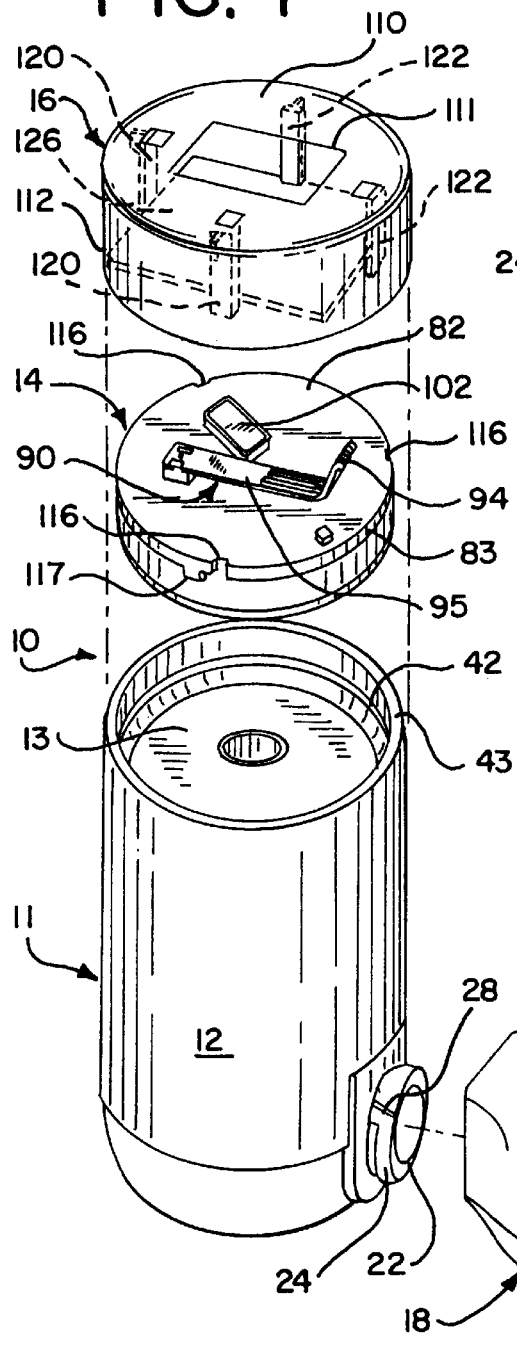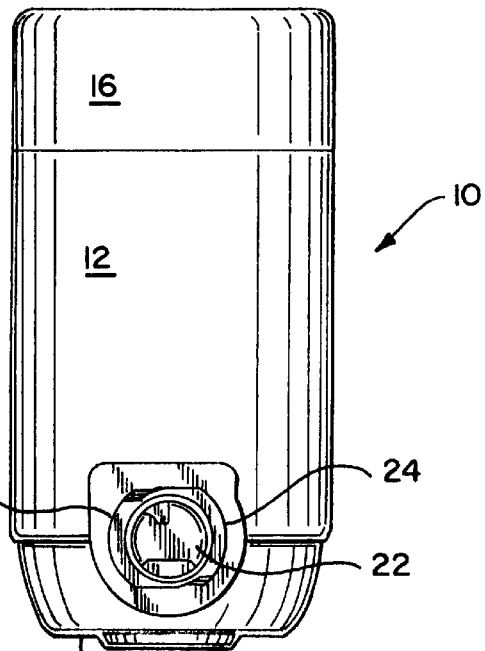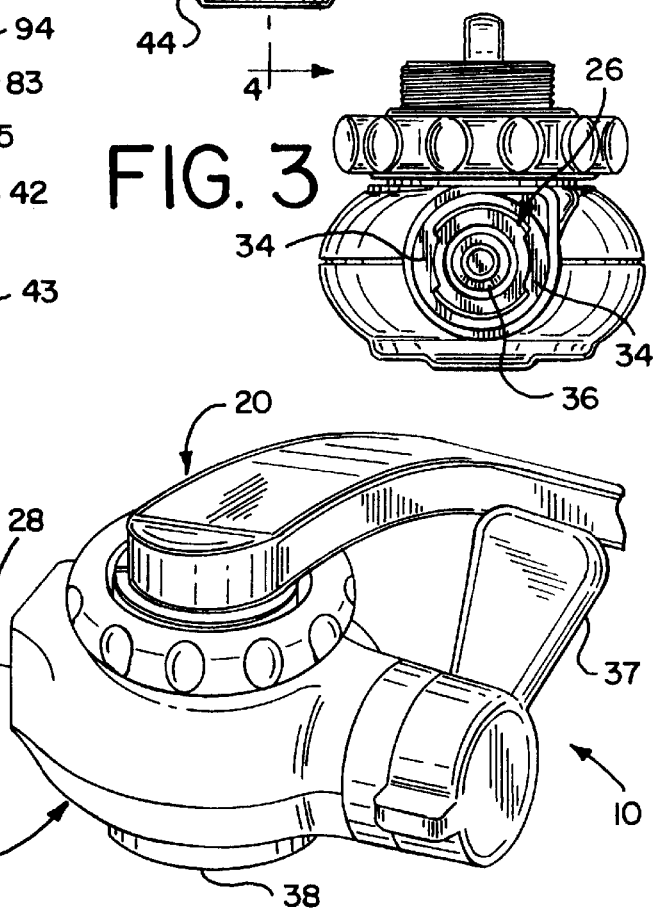

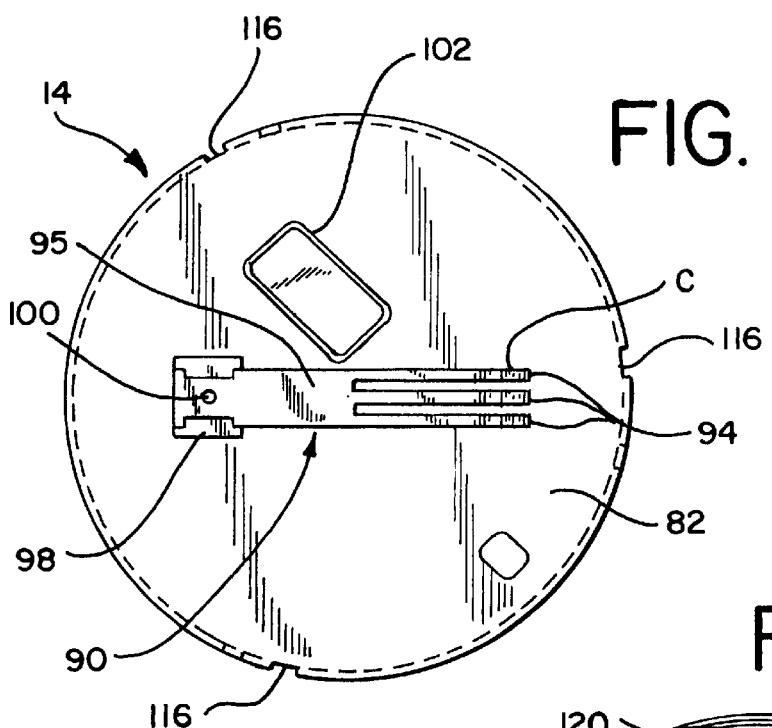
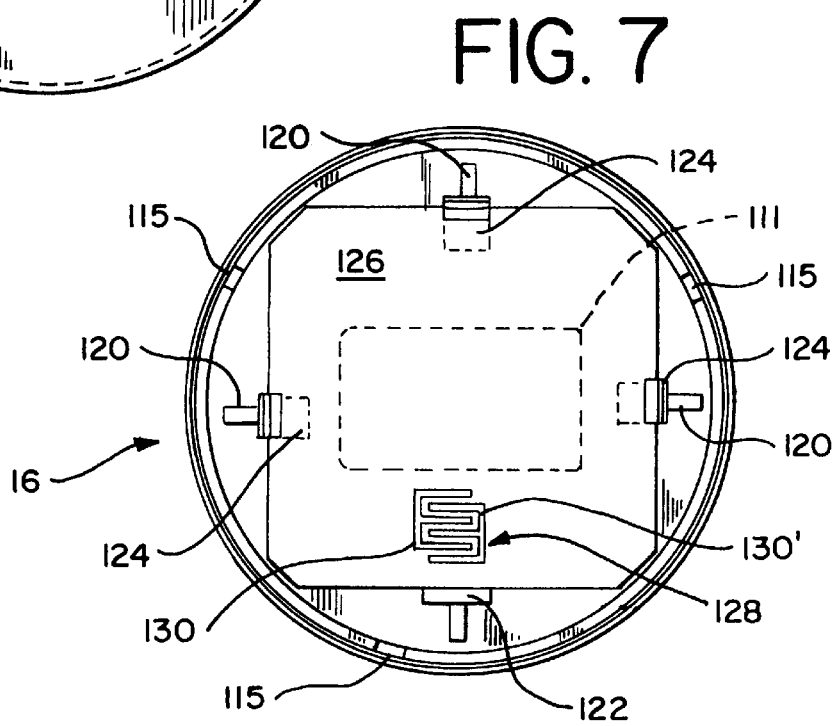

WATER FILTER WITH PRESSURE ACTUATED FLOW MONITOR

BACKGROUND OF THE INVENTION

This invention relates generally to water filtration systems. Specifically, it relates to a faucet mounted water filter with a mechanism for notifying a user of the expiration of the useful life of the water filter media.

Faucet mounted water filtration systems are used in many households and other generally non-commercial environments for purifying drinking water. Such filters are known to eliminate several noxious substances, as well as to improve the taste, smell and appearance of tap water.

The filter media of conventional faucet mounted water filtration systems has a limited useful life. After a certain volume of water has passed through the media, the media becomes saturated with impurities and is unable to remove additional impurities from the water. However, with most conventional filters of this type, it is impossible for the user to accurately determine when the media is spent. Therefore, one of the problems associated with faucet mounted water filters has been the question of how a consumer knows when to change the filter media.

In some faucet mounted filtration systems, the practice has been to determine the life of the filter by the amount of time the filter is connected to a water supply, without regard to the volume of water which has actually passed through the filter. A manufacturer typically recommends that a filter be replaced after an amount of time reflective of the manufacturer's estimate of a typical user's filtered water needs. In many instances, the filter may become useless before the recommended time has elapsed because the flow through the filter was more than anticipated by the manufacturer. On the other hand, when water volume is less than anticipated, a filter may have additional useful life although the suggested filter lifetime has elapsed.

Several methods for measuring the life of water filters are known in the art. U.S. Pat. No. 4,885,081 to Oliver discloses a method of incorporating an electrical switch into the handle of a sink-mounted third faucet for a water filtration system installed below the sink or other remote location. The switch is connected to an electrical circuit which tallies the total elapsed time the handle is depressed to determine the amount of water processed. The disadvantages of U.S. Pat. No. 4,885,081 include the need for electronic circuitry disposed in a third faucet handle. For faucet mounted filtration systems, no third faucet is present. Also, each time the main faucet is used, water is not necessarily passing through the filter. Accordingly, the structure as described by Oliver is inapplicable.

A faucet mounted water filter with a timing mechanism has been proposed in U.S. pat. No. 4,431,533 to Wrede. This filter relies on the storage capacity of a battery to provide the timing mechanism for determining filter life. The battery life is chosen to correspond to filter life and a user is informed of the filter's expiration when a light on the filter no longer burns. This system has several disadvantages. As batteries have a limited shelf life, its possible that the battery will be partially discharged before the filtering system is connected to a faucet. Accordingly, the filter media will have remaining lifetime even though the battery is dead. Also, since the battery and indicator circuitry expires with the filter, the need for the circuitry to be disposable adds to the expense of the filter.

Thus, a first object of the present invention is to provide an improved faucet mounted water filtration system with an accurate indicator of the expiration of the filter media.

Another object of the present invention is to provide an improved water filtration system capable of accurately measuring the volume of water flow through the system.

It is a further object of the present invention to provide an improved filter life monitoring system that allows for the use of different filter medias with variable filter lives.

Yet another object of the present invention is to provide an improved filter life monitoring system of a compact and economical design consistent with a faucet mounted water filtration system.

Still another object of the present invention is to provide an improved water filtration system with reusable filter monitor circuitry and a disposable filter media.

These and other objects of the invention will be discussed or will be apparent from the following detailed description of the invention.

BRIEF SUMMARY OF THE INVENTION

The above-listed objects are met or exceeded by the present faucet mounted water filtration system. The invention features a disposable filter cartridge in the form of a housing containing a filter media. A flexible cap on the cartridge deflects when water flows through the filter media. The deflection of the cap causes the completion of an electrical circuit contained in a reusable cartridge cover. A microprocessor within the circuit calculates the time the circuit has been complete and, therefore, the amount of time water has flown though the cartridge. Since the invention provides for a constant rate of water flow through the cartridge, the time the circuit is complete reflects the volume of water purified. Once a predetermined amount of time elapses, the microprocessor energizes a display on the cartridge cover to notify the user that the cartridge needs replacement. The invention also provides for a method for detecting between two types of user selectable cartridges with different filtration volume capacities.

More specifically, the present invention provides for a fluid flow measuring apparatus including a housing with an inlet connected to a fluid supply, an outlet and a flexible cap. Fluid flow through the housing causes a deflection of the flexible cap, which in turn causes two contacts on an electrical circuit to engage and complete the circuit. The circuit monitors the time it is complete. In a preferred embodiment, the circuit is contained on a circuit board housed in a cover over the flexible cap. Upon flexion of the flexible cap, a conductive actuator arm on the flexible cap simultaneously engages the two electrical contacts, thereby completing the electrical circuit.

In another embodiment, a water filtration system includes a filter cartridge with flexible cap. Water flow through the cartridge causes a deflection of the flexible cap. An electrical circuit contained on a circuit board disposed within a cover over the flexible cap is completed by the deflection of the cap. A constant rate of flow of water is maintained into the housing. The circuit counts the amount of time the circuit is complete and, after a predetermined amount of time has expired, an LCD is energized to alert the user that the cartridge needs replacement. Optionally included with the circuit is a reed switch which detects the presence or absence of a magnet on top of the flexible cap. The magnet is present on the cap of one of two distinct, user selectable filter media cartridges representing different filtration volume capacities. The circuit determines the amount of time to count based upon whether a magnet is present on the flexible cap.

BRIEF DESCRIPTION OF THE DRAWINGS

FIG. 1 is an exploded perspective view of the faucet mounted water filtration system embodying the present invention;

FIG. 2 is a right side elevational view of the filter housing;

FIG. 3 is a left side elevational view of the water diverter;

FIG. 5 is an overhead plan view of the preferred embodiment of the flexible cap of the present water filtration system;

FIG. 7 is a bottom elevational view of the cover shown in FIG. 4; and

DETAILED DESCRIPTION OF THE INVENTION

Figure 6:
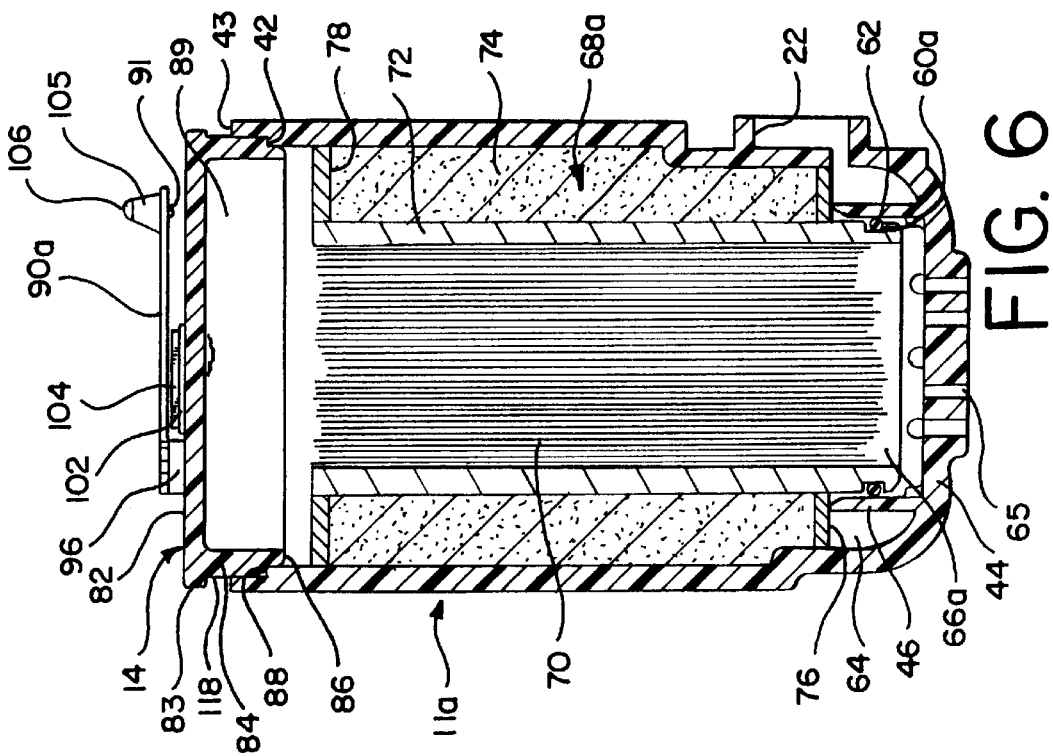
FIG. 6 is a sectional view of an alternative embodiment of the filter cartridge shown in FIG. 4.

Referring now to FIGS. 1, 2 and 3, a water filtration system is shown and generally designated as 10. A disposable filter cartridge assembly 11, also referred to as the cartridge, includes a housing 12, a filter media 13, and a flexible cap 14. A cover 16 encloses the flexible cap 14. A diverter shown generally as 18, connects the cartridge 11 to a sink faucet 20.

A pair of bayonet-like fittings connect the cartridge 11 to the diverter 18. A housing inlet 22 on the housing 12 has two wide threads 24, each with a stop 28. On the diverter 18 (best seen in FIG. 3), a diverter outlet 26 includes at least a pair of locking tabs 34. Once the locking tabs 34 are aligned with the threads 24, a one-half turn of the cartridge 11 relative to the diverter 18 properly locks and aligns the cartridge to the diverter. A gasket 36 retained in the diverter outlet 26 provides for a watertight seal and also has a reduced diameter inner opening to provide for a constant flow of water into the cartridge 11 under typical household water pressure situations.

The diverter 18 includes a handle 37 which allows for the selectable direction of tap water from the faucet 20 to either a sink through a tap water outlet 38 or to the cartridge 11 through the outlet 26.

Figure 4:
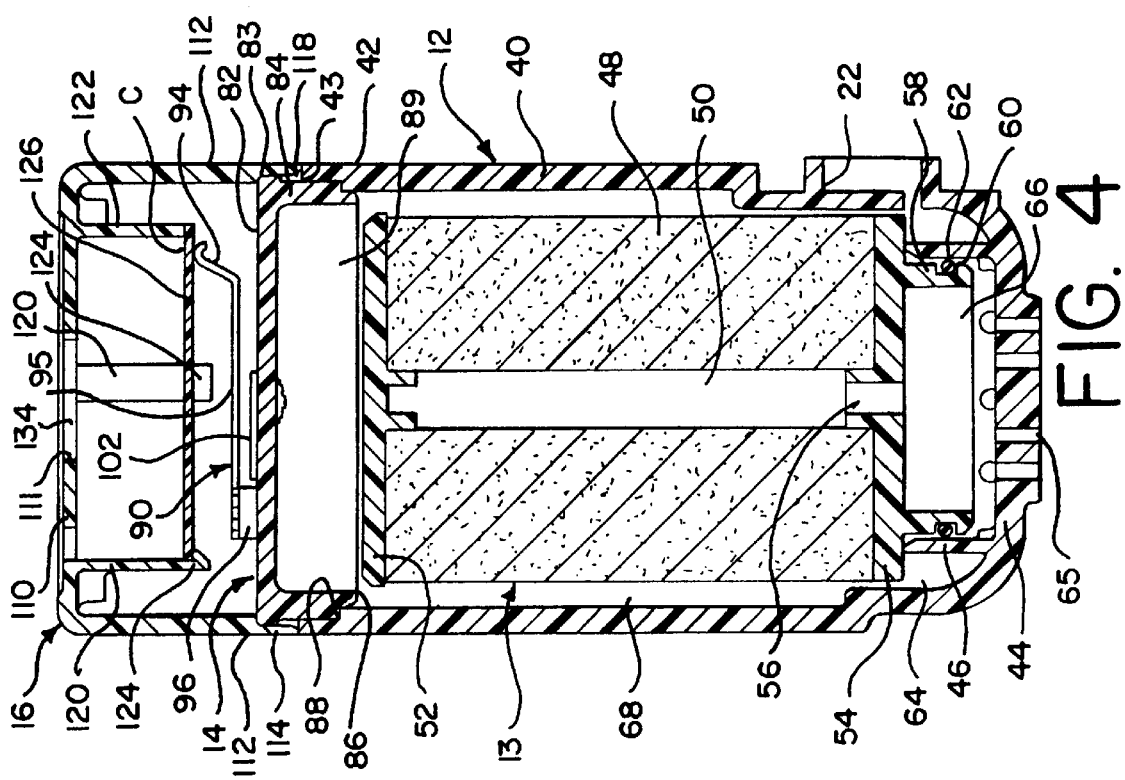
FIG. 4 is a 4 sectional view of the preferred embodiment of the filter system taken generally along line 4—4 of FIG. 2.

Referring now to FIG. 4, the housing 12 includes a sidewall 40 with an annular upper counterbore 42 and a generally cylindrical landing 43. Opposite the counterbore 42, the housing has a bottom portion 44 with an internal, generally vertically projecting, and preferably integrally formed, annular mounting ring 46. In the preferred embodiment of the invention, the water filter media 13 includes a generally cylindrical carbon block 48 defining a central channel 50. The block 48 has a media cover 52 and is seated on a media base 54. Included on the base 54 are an aperture 56 and a depending skirt 58 with an annular groove 60. Closely engaged in the mounting ring 46 is the depending skirt 58, which is provided with an O-ring 62 or equivalent sealing device retained in the groove 60 to provide a seal between the mounting ring and the skirt 58.

The mounting ring 46 and the side wall 40 form an annular entrance chamber 64, while the bottom portion 44 and the media base 54 define an exit chamber 66. The carbon block 48 and the sidewall 40 define an annular filter chamber 68. A number of relatively small diameter exit channels 65 are provided on the bottom portion 44 for dispensing filtered water.

An alternate embodiment of the cartridge 11 is shown in FIG. 6 and is generally designated 11a. Components of the cartridge 11a which are identical to the components of the cartridge 11 have been designated with identical reference numerals. In the cartridge 11a, the main distinction is that the carbon block media 13 of the cartridge 11 has been replaced by a bundle of hollow filter fibers 70 encased by a bundle wall 72, and is surrounded by a supply of granular activated carbon filter media 74. The bundle wall 72 has an annular groove 60a and is seated in the mounting ring 46. The O-ring 62 retained in the groove 60a provides a seal between the mounting ring 46 and the bundle wall 72. An annular chamber 68a, which is filled with the granulated activated carbon 74, is defined by the bundle wall 72 and the sidewall 70. A lower perforated, generally flat ring 76 and a similar upper perforated ring 78 retain the granulated carbon within the annular chamber 68a while allowing free passage of water through the rings 76 and 78. The exit chamber 66a is formed by the lower ends of the fibers 70 and the bottom portion 44.

Returning now to FIG. 4, the flexible cap 14 includes a flexible and resilient top wall 82, a radially projecting peripheral lip 83 and a depending recessed sidewall 84. A lower end of the sidewall 84 has an undercut flange 86 and a shoulder 88. The shoulder 88 rests upon the counterbore 42 to define an annular groove 118 between the peripheral lip 83 and the landing 43. The underside of the flexible cap defines an upper chamber 89 which creates a space above the media 13.

In the preferred embodiment, the flexible cap 14 is made of ABS plastic, however it will be appreciated that a number of alternate plastic materials will provide the required water repellency, flexibility and resiliency as explained below. The housing 12 may be formed of any suitable plastic for use with a water filter and which is compatible with an ABS or similar flexible cap material such that a watertight seal between the flexible cap 14 and the housing 12 may be accomplished. Preferably, the sidewall 84 is secured to the sidewall 40 by sonic welding, however, alternate watertight fastening technologies, including chemical adhesives, are contemplated which are known to skilled practitioners.

In operation, the user activates the handle 37 to direct the tap water into the housing 12 through the inlet 22. In the preferred embodiment of the invention shown in FIG. 4, water progressively fills the annular entrance chamber 64, the annular filter chamber 68 and the upper chamber 89. The water passes radially through the carbon block 48 where it is filtered, enters the channel 50, passes through the aperture 56 and into the exit chamber 66. By providing a plurality of relatively small diameter exit channels 65, a uniform dispersion of purified water is achieved. In addition, the channels 65 create a back pressure within the housing 12.

In the alternative embodiment shown in FIG. 6, water flows from the inlet 22 into the entrance chamber 64. The water flows through the lower perforated ring 76, migrates upward through, and is filtered by, the activated granulated carbon 74, flows through the upper perforated ring 78, over the top of the bundle wall 72 and fills the upper chamber 89. The water then is again filtered as it migrates down through the hollow filter fibers 70 into the exit chamber 66a before it is dispersed through the exit channels 65.

Referring now to FIGS. 4 and 5, an actuator member 90 is fastened to, and protrudes from, the top wall 82 of the flexible cap 14. Preferably, the actuator member 90 is fastened by a heat spike 100 to an actuator base 96 molded into the top wall 82. In the preferred embodiment, the actuator member 90, has a forked end with three elongated, generally vertically flattened tines 94. The tines 94 are joined to a common base 95 and have generally 'S' shaped profiles (best seen in FIG. 4). As will be described below, this profile defines a contact point 'C' for energizing a counting circuit to monitor the time during which water is being filtered by the system 10.

Referring now to FIG. 6, an alternative embodiment of the cap 14 includes an actuator member 90a which has a knob 105 fastened to an upper end surface of the member by a second heat spike 91. A conductive pad 106 is bonded to the top of the knob 105 by chemical adhesion or other suitable fastening technology. In some cases, and for certain applications, a magnet base 102 is molded into the top surface 82 of either of the cartridges depicted in FIGS. 4 and 6. A magnet 104 is fixed in the magnet base 102 by chemical adhesion or other fastening technology.

Referring now to FIGS. 1, 4 and 7, the cover 16 has a top display wall 110 with a generally centrally located display window 111 and a skirt 112 depending from a periphery of the wall 110. A lower rim of the skirt 112 has a radially recessed portion 114 (best seen in FIG. 4). Three lugs 115 (best seen in FIG. 7) are provided on the inside of the recessed portion 114 in generally regularly spaced relationship to each other. The lugs 115 correspond to three notches 116 in the lip 83 of the flexible cap 14. The cover 16 is secured to the flexible cap 14 by mating the lugs 115 with the notches 116 and sliding the cover over the flexible cap. Once the cover 16 is seated, it can be locked in place by rotating the cover to slide the lugs 115 in the annular groove 118 until at least one of the lugs contacts a corresponding stop 117 (best seen in FIG. 1). Each stop 117 is preferably a block-like formation molded into the sidewall 84. An interference fit between the lugs 115 and the groove 118 securely locks the cover 16 over the cap 14. Proper orientation of the cover 16 relative to the cap 14 is achieved by the engagement between the lugs 115 and the at least one stop 117.

Referring now to FIGS. 1 and 7, the cover 16 includes three barbed retaining arms 120 and one unbarbed retaining arm 122 depending from the underside of the display wall 110. Each of the barbed retaining arms 120 have a barbed end 124. A circuit board 126 is retained in a depending, spaced relationship to the underside of the display wall 110 by being cradled in the barbed ends 124. Preferably, each retaining arm 120 engages a corresponding edge of the circuit board. To retain the board 126 in place, the unbarbed retaining arm 122 exerts a slight frictional biasing force on a corresponding edge of the circuit board.

Figure 8:
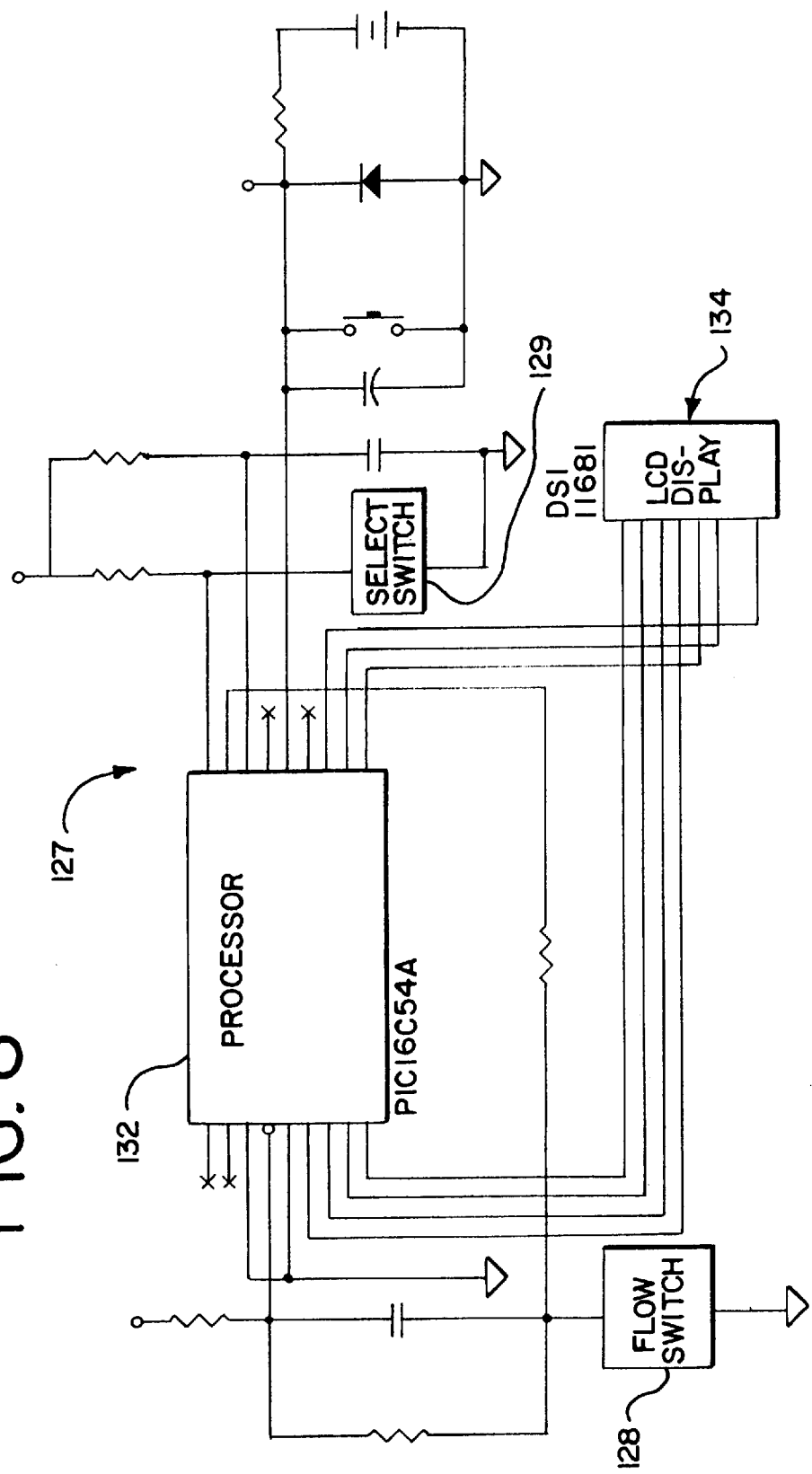
FIG. 8 is a block diagram for an electrical circuit suitable for use with the present water filtration system.

Referring now to FIG. 8, the circuit board 126 carries an electrical circuit 127, generally designated. Included in the circuit 127 is a flow switch 128, a selector switch 129, a processor chip 132, and an LCD display 134. As shown on FIG. 7, the flow switch 128 consists of two electrical contacts 130, 130', each having a number of parallel and alternating, but non-engaging or separated contact points which together create an interlocking contact grid. In the preferred embodiment of the invention, the flow switch 128 is positioned on the circuit board 126 such that the tines 94 of the actuator member 90 are in an operational relationship to and perpendicular to the parallel contact points 130, 130' when the lugs 115 of the cover 14 are properly secured in the grooves 118 against the stops 117. In the embodiment of FIG. 6, the conductive pad 106 of the actuator member 90 is in an operational relationship to the switch contact points 130, 130'.

In operation, the exit channels 65 produce a partial restriction on water flow. Accordingly, when a user turns the handle 37 to direct water into the cartridge 11, a back pressure develops in the chambers 64, 66, 68 and 89 in the preferred embodiment shown in FIG. 4 (64, 66a, 68a and 89 in the embodiment of FIG. 6). This back pressure causes an outward or upward deflection of the top wall 82 of the flexible cap 14. The actuator member 90 amplifies the distance of the deflection of the flexible cap 14 and, in the preferred embodiment of the invention, the tines 94 of the actuator member 90 engage the contact points 130, 130' of the flow switch 128. An advantage of the configuration of the actuator 90 is that the tines 94 provide numerous paths of conductivity at the contact point C between the otherwise separated contact points 130, 130' on the circuit 127, which closes the flow switch 128. In the alternative embodiment shown in FIG. 6, the conductive pad 106 engages the parallel contact points 130 to similarly close the flow switch 128.

The processor chip 132 begins counting time when the flow switch 128 is closed and stops counting when the switch is open. In this manner, the processor chip 132 accumulates time over multiple uses. Once it determines that the flow switch 128 has been closed for a total of a predetermined amount of time, the chip 132 energizes the LCD display 134, which generates a viewable message in the display window 111 indicating that the filter cartridge 11 should be replaced. In the preferred embodiment, the processor chip is a OTP programmable chip such as model No. 16C54A manufactured by Microchip of Chandler, Ariz. The LCD display is a conventional seven segment display available from numerous sources.

Unlike many conventional faucet mount filters, the present system 10 only measures the time when filtered water is actually being dispensed. Once the water flow through the cartridge stops, the inherent memory of the flexible cap 14 causes it to return to its original position, and the flow switch 128 is opened.

In the preferred embodiment, the selector switch 129 is a reed switch positioned on the circuit board 126 such that the magnet 104, if present on the flexible cap 14, is in an operational relationship to the switch 129 when the lugs 115 are secured in the groove 118 against stops 117. The processor chip 132 is programmed to count one of two predetermined amounts of time determined by whether the magnet 104 is present on the flexible cap 14 thereby closing the selector switch 129. In this manner, cartridges 11 of differing filtration volume capacities may be interchangeably used in the system 10 and still receive the accurate volume monitoring benefits of the system. The remaining elements of the electrical circuit 127 are obvious to one skilled in the electrical arts.

An advantage of the system 10 is that once the filter element needs replacement, the cover 16 with the circuit board 126 may be detached and retained. Only the cartridge 11 including the housing 12, the cap 14 and the enclosed filter media 13, 70, 74, need to be replaced.

While particular embodiments of a faucet mounted water filtration system has been shown and described, it will be appreciated by those skilled in the art that changes and modifications may be made thereto without departing from the invention in its broader aspects and as set forth in the following claims.

We claim:

1. A fluid flow measuring apparatus comprising:

a housing with a fluid inlet connected to a fluid supply, a fluid outlet, a cap end and a flexible cap for sealing said cap end;

means for directing fluid flow through said housing such that fluid pressure causes a deflection of said flexible cap; and an electrical circuit associated with said housing and having a first electrical contact and a second electrical contact, said first electrical contact being in an operational relationship with said flexible cap and said second electrical contact such that the deflection of said flexible cap causes said first electrical contact to engage said second electrical contact thereby completing said electrical circuit, said circuit further having a counting means for counting the time said circuit is complete.

2. The measuring apparatus according to claim 1 wherein said flexible cap has an outer surface and said first electrical contact is attached to said outer surface.

3. The measuring apparatus according to claim 1 further comprising:

said flexible cap having an outer surface; and an actuator member protruding from said outer surface and having a portion in proximity to said first and second electrical contacts such that the deflection of said flexible cap causes said actuator member to move said first electrical contact to engage said second electrical contact.

4. The measuring apparatus according to claim 1 further comprising:

said flexible cap having an outer surface; and an electrically conductive actuator member protruding from said outer surface and having a portion in proximity to said first and second electrical contacts such that the deflection of said flexible cap causes said actuator member to simultaneously engage said first and second electrical contacts.

5. The measuring apparatus according to claim 4, wherein said actuator member has a forked end with a plurality of tines.

6. The measuring apparatus according to claim 4, wherein said actuator member has an end with a conductive pad.

7. The measuring apparatus according to claim 1 further comprising:

a cover, said cover being removably engaged with said flexible cap such that said cover encloses said cap;

said cover having an inner side facing said cap;

said electrical circuit being contained on a circuit board; and said inner side having a means for accommodating said circuit board.

8. The measuring apparatus according to claim 7 wherein said means for accommodating said circuit board includes a plurality of elongated appendages and one elongated securing member disposed on the inner side of said cap, said appendages having barbed ends and said securing member retaining said circuit board against said barbed ends.

9. The measuring apparatus according to claim 1 further comprising a means for creating a constant flow of fluid into said housing, and said electrical circuit further having a means for generating a message when said circuit has been completed for a finite amount of time, such that the message indicates a specific volume of fluid has passed through said housing.

10. A water filtration system with a filter life monitor comprising:

a housing with an inlet, an outlet, a cap end, a flexible cap for sealing said cap end, and a cover engaged with said cap end such that said cover encloses said cap end and said flexible cap;

at least one contact surface on said flexible cap;

a water filter media disposed within said housing;

directing means for directing fluid flow through said housing such that fluid pressure causes a deflection of said flexible cap;

means for creating a constant water flow into said housing;

an electrical circuit associated with said housing, said electrical circuit having at least a first electrical contact and a second electrical contact, said first and second electrical contacts being in an operational relationship with said contact surface on said flexible cap such that the deflection of said flexible cap results in electrical continuity between said first electrical contact and said second electrical contact thereby completing said electrical circuit; and said circuit further having a counting means for counting the time said circuit is complete and a means for generating a message when said circuit is complete for a predetermined amount of time.

11. The system according to claim 10 wherein said electrical circuit further has a receptor means for receiving a filtration capacity signal and said flexible cap further has a signaling means in an operational relationship to said receptor means to provide said signal to said circuit, said signal determining the amount of time said circuit must be completed prior to said circuit generating a message.

12. The system according to claim 11 wherein said receptor means is a reed switch and said signaling means is the presence or absence of a magnet on said flexible cap whereby the presence of said magnet signals said circuit to count a first amount of time prior to generating a message and the absence of said magnet signals said circuit to count a second amount of time prior to generating a message.

13. The system according to claim 12 wherein said water filter media is an activated carbon block and said magnet is present on said flexible cap.

14. The system according to claim 12 wherein said filter media is a combination of granulated activated carbon and hollow filter fibers and lacks a magnet for signaling said reed switch.

15. The system according to claim 10 wherein said filter media is a combination of granulated activated carbon and hollow filter fibers.

16. The system according to claim 10, further comprising:

a body with a spout end, a filter end, an outlet and a means for directing water flow from said spout end to one of said filter end and said body outlet;

said spout end having a first connecting means for connecting said spout end to a sink faucet;

said filter end having a second connecting means for connecting said filter end to said inlet of said housing;

said means for creating a constant water flow into said housing including a bushing at the filter end of the body.

17. The system according to claim 10, wherein said means for generating a message is a liquid crystal display.

18. A fluid flow measuring apparatus comprising:

a housing with a fluid inlet connected to a fluid supply, a fluid outlet, a cap end and a flexible cap for sealing said cap end;

means for directing fluid flow through said housing such that fluid pressure causes a deflection of said flexible cap; and an electrical circuit associated with said housing and having a first electrical contact and a second electrical contact, said first electrical contact being in an operational relationship with said flexible cap and said second electrical contact such that the deflection of said flexible cap causes said first electrical contact to engage said second electrical contact thereby completing said electrical circuit, said circuit further having a counting means for counting the time said circuit is complete and a means for generating a message when said circuit is complete for a predetermined amount of time; and said electrical circuit further has a receptor means for receiving a signal and said flexible cap further has a signaling means in operational relationship to said receptor means to provide a signal to said circuit, said signal determining the amount of time said circuit must be completed prior to said circuit generating a message.

19. The measuring apparatus according to claim 18 wherein said receptor means is a reed switch and said signaling means is the presence or absence of a magnet on said flexible cap, whereby the presence of said magnet signals the circuit to count a first amount of time prior to generating a message and the absence of said magnet signals said circuit to count a second amount of time prior to generating a message.

20. A fluid flow measuring apparatus comprising:
a housing with a fluid inlet connected to a fluid supply, a fluid outlet, a cap end and a flexible cap for sealing said cap end;

at least one chamber formed within said housing that directs fluid flow through said housing such that fluid pressure causes a deflection of said flexible cap; and an electrical circuit associated with said housing and having a first electrical contact and a second electrical contact, said first electrical contact being in an operational relationship with said flexible cap and said second electrical contact such that the deflection of said flexible cap causes said first electrical contact to engage said second electrical contact thereby completing said electrical circuit, said circuit further having a counting means for counting the time said circuit is complete.

21. The fluid flow measuring apparatus according to claim 20 wherein said electrical circuit further has a receptor means for receiving a filtration capacity signal and said flexible cap further has a signaling means in an operational relationship to said receptor means to provide said signal to said circuit, said signal determining the amount of time said circuit must be completed prior to said circuit generating a message, such that different types of filters with different life expectancies may be used within the same fluid flow measuring apparatus.

* * * * *